United States Patent [19]

Johnson

[11] 4,212,584
[45] Jul. 15, 1980

[54] MATERIAL HANDLING APPARATUS

[75] Inventor: Donald O. Johnson, Matawan, N.J.

[73] Assignee: American Can Company, Greenwich, Conn.

[21] Appl. No.: 954,469

[22] Filed: Oct. 25, 1978

[51] Int. Cl.² ............................................. B65H 5/18
[52] U.S. Cl. ................................. 414/748; 198/492; 198/531; 221/298
[58] Field of Search ............... 414/745, 748; 198/492, 198/531; 221/289, 298; 193/32, 40

[56] References Cited

U.S. PATENT DOCUMENTS

| | | | |
|---|---|---|---|
| 2,644,564 | 7/1953 | Bassoff | 193/40 |
| 2,835,372 | 5/1958 | Biddison | 414/748 X |
| 2,997,725 | 8/1961 | Friedman | 414/748 X |
| 3,306,472 | 2/1967 | Blanz | 414/748 |
| 3,502,191 | 3/1970 | Vald | 198/489 |
| 3,667,619 | 6/1972 | Lindblom | 414/748 |

Primary Examiner—Stephen G. Kunin
Assistant Examiner—George F. Abraham
Attorney, Agent, or Firm—Robert P. Auber; George P. Ziehmer; Harry W. Hargis, III

[57] ABSTRACT

An inclined conveyor for lowering uniformly spaced, cylindrical articles comprises a pair of inclined rails, paired pivotal rockers and fingers disposed along the inclined rails, and a pair of drawbars for sequentially pivoting the inclined pairs of rockers and fingers. The paired pivotal rockers and fingers are so cooperably disposed as to define a series of article receiving pockets accommodating controlled gravitational movement of the articles along the rails, as the rockers and fingers are sequentially pivoted by the drawbars.

11 Claims, 7 Drawing Figures

MATERIAL HANDLING APPARATUS

BACKGROUND OF THE INVENTION

This invention relates to material handling apparatus, and, while of broader applicability, is particularly directed to an improved inclined conveyor for moving cylindrical shafts transversely of their polar axes from a higher to a lower level. Occasion has arisen in the handling of materials, such as, for example, flanged-end automotive axles, wherein they must be moved in predetermined sequence from a higher to a lower level and over a very short distance. In one such instance, it has been found necessary to move such axles along a path inclined about 40°. In moving the axles, they are transferred tranversely of their polar axes, and it is desirable that they not be permitted to strike one another. Contributing also to problems of handling is the fact that flanged-end axles inherently are unbalanced, due to their asymmetric configurations, i.e. non-uniform cross section, as respects their direction of movement.

Prior art apparatuses are known for moving cylindrical objects along an incline from higher to lower levels, but not all afford individual, impact-free transfer of unbalanced articles while affording access thereto in the course of transfer.

The following U.S. Patents are representative of the prior art, and are believed material to the Examination of this application.

U.S. Pat. No. 2,644,564 discloses a gravity feed chute 12 for gears 10, including gear stop fingers 26 actuatable by levers 30.

U.S. Pat. No. 2,835,372 discloses a pair of inclined guide rails 110 along which the movements of armature cores 20 are controlled by pivotable fingers 118, 120.

U.S. Pat. No. 2,997,725 discloses a series of transfer wheels 38 for receiving and transferring rod-shaped articles B in recesses 37 provided in the wheels.

U.S. Pat. No. 3,306,472 discloses an inclined table section 12 for supporting bar stock 27, and pivotable gates 25 cooperably disposed as respects the bar stock and the table section to permit the bar stock to roll, one at a time, down the table section.

U.S. Pat. No. 3,502,191 discloses relatively rockable disc segments 2, 3 provided with notches 6, 7 cooperable to receive and transfer logs fed thereto from an inclined conveyor 1.

U.S. Pat. No. 3,667,619 discloses a tiltable chute 5 for trees I, II, III which are held from sliding by a pivotable claw 10 in its one position and permitted to slide in another position of the claw.

It is a general objective of the present invention to provide improved material handling apparatus facilitating the handling of elongated, generally cylindrical articles of non-uniform cross-section.

It is a further objective of the invention to provide improved material handling apparatus utilizing a combination of motor and gravitationally driven linkages.

It is a still further objective of the invention to provide improved conveyor means for feeding elongate articles of various sizes.

SUMMARY OF THE INVENTION

In achievement of the foregoing as well as other objectives and advantages, the invention contemplates, in material handling apparatus, inclined conveyor means for lowering spaced, substantially parallel cylindrical articles, comprising: means defining an inclined track along which said articles may be moved between a higher and lower level; a plurality of article-engaging pivotable rocker and finger elements disposed in uniformly spaced relation along said track, each said rocker element being pivotable in one direction to accommodate movement of an article along said track and present it for engagement with a successive one of said finger elements, whereupon said one finger element is operable to accommodate movement of said article along said track and present it for engagement with a successive rocker element; and means for driving said rocker and finger elements cyclically in the recited operations thereof to accommodate movement of an article along said track between said higher and said lower level.

The manner in which the foregoing objectives and advantages of the invention may best be achieved will be more fully understood from a consideration of the following description, taken in light of the accompanying drawing.

DESCRIPTION OF THE PREFERRED EMBODIMENT

Figure 1:
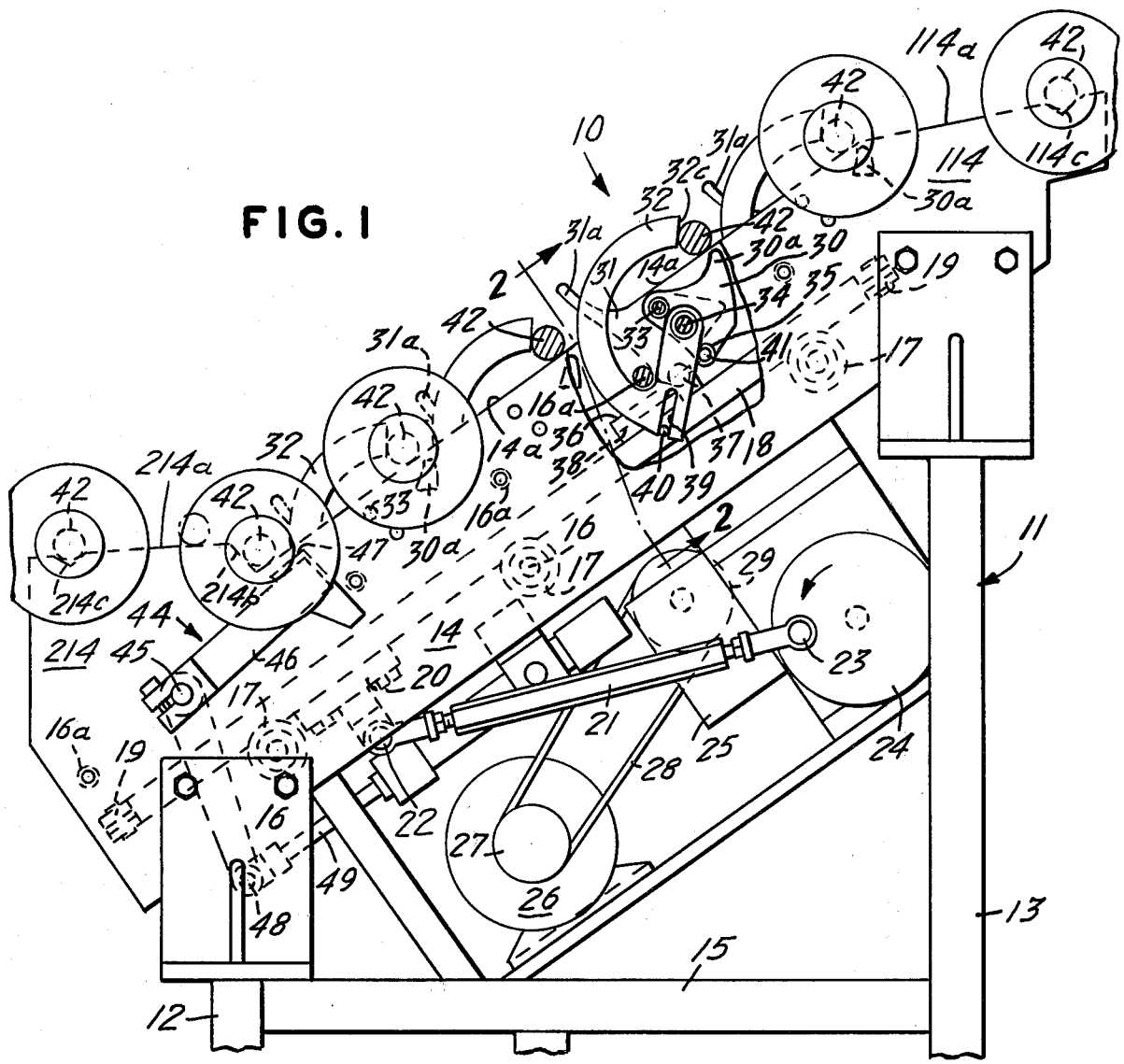
FIG. 1 is a fragmented side elevational showing of material handling apparatus embodying the invention.

With more detailed reference to the drawing, there is seen in FIG. 1 material handling apparatus comprising a conveyor designated generally by the numeral 10, and including a frame 11 having spaced vertical support members 12, 13 for a track defined by a pair of parallel article support rails 14 (see also FIG. 2) extending at an angle of about 40° relative to the horizontal. Cross member 15 extends between and braces the vertical members. Rails 14 are cross-braced by uniformly spaced tie rods, as seen at 16, 16a, and rods 16 serve also as bearing supports for flanged rollers 17 on which a pair of drawbars 18 are movable in the direction of track extent, for reasons to be more fully explained in what follows. Drawbars 18 are interconnected by end braces 19 and an intermediate brace 20. The drawbars are reciprocably driven, as a unit linearly, through a connecting rod 21 pinned at its one end, as seen at 22, to brace 20, and pinned at its other end, as seen at 23, to a wheel 24 on the output shaft of a speed reducer 25 of conventional construction. Reducer 25 is driven by a motor 26 through a pulley 27 on its shaft and a belt 28 looped thereover and over a pulley 29 on the input shaft of the speed reducer.

In especial accordance with the invention, there are provided a plurality of spaced, article handling stations, each comprising a pair of mutually confronting rocker elements including rockers 30 and 31, and a pair of similarly confronting finger elements 32. Each of the rockers 30, 31 is mounted for pivotation in a vertical plane on a common pin 33 supported on a rail 14. Each finger 32 is mounted for pivotation in a vertical plane on a pin 34 supported also on rail 14. Each rocker 30 includes a cam follower 35 engageable by a linear cam 36 on a drawbar 18, and each rocker 31 includes a cam follower 37 engageable by a linear cam 38 also on drawbar 18. Each finger 32 includes a slot 39 that receives a laterally projecting pin 40 on a drawbar 18.

Figure 2:
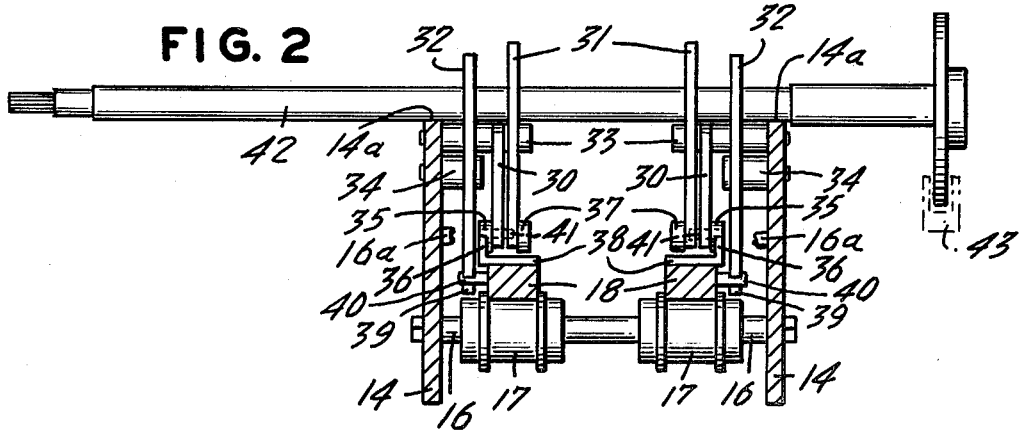
FIG. 2 is an enlarged section taken generally in the plane of line 2—2 in FIG. 1, and looking in the direction of arrows applied thereto.
Figure 3:
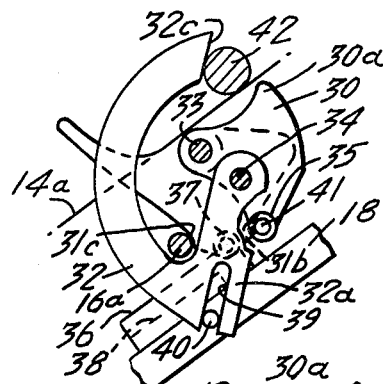
FIGS. 3 through 7 are enlarged side elevational showings of a portion of the apparatus seen in FIG. 1, and illustrating operational features thereof.
Figure 4:
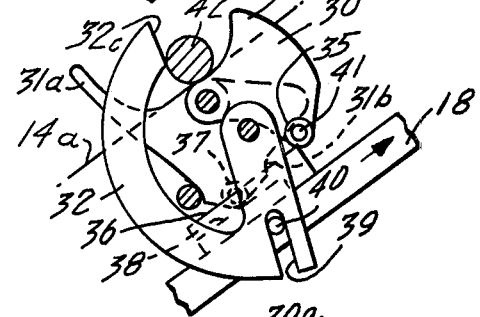
Figure 5:
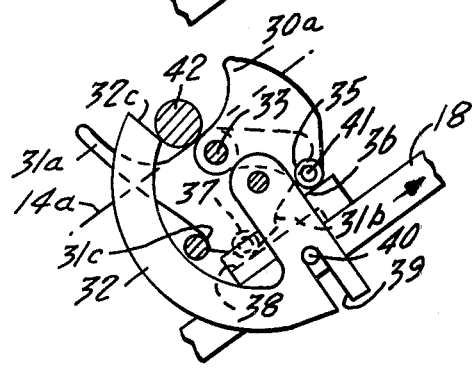

Construction and arrangement of the drawbars 18, rockers 30, 31, their related cams 36, 38 and cam followers 35, 37, and fingers 32 and their related slots 39 and pins 40 is such that movement of the drawbars 18 downward, toward the left to the position shown in FIGS. 1, 2, and 3: through driving connection afforded by pins 39 and slots 40 pivots each finger 32 clockwise (i.e right-hand) to its fully extended portion; moves each cam 36 out of engagement with its follower 35, permitting a rocker 30 gravitationally to pivot clockwise until a pin 41, concentric with a cam follower 35 and projecting to the opposite side of each rocker 30, engages an edge portion 31b of a rocker 31, causing rocker 31 to pivot clockwise and edge portion 31c to engage a tie rod 16a as a stop. While held in this position each cam follower 37 is disengaged from its cam 38. Each rocker 31 tends gravitationally to rotate clockwise (right-hand) since its center of gravity is disposed to the right of its pivot pin 33.

Each rocker 30 is provided with a head portion 30a which in the position shown in FIGS. 1, 2 and 3 is disposed below the plane of the bearing surfaces 14a of rails 14. Head portion 30a preferably is cuspidate in shape, having an article-engaging, convexly arcuate surface presented upstream of the apparatus and a concavely arcuate surface presented downstream. Each rocker 31 is provided with a tail portion 31a which in FIGS. 1, 2 and 3 projects beyond the plane of rail bearing surfaces 14a. The tail portion 31a also is generally cuspidate in shape, and includes an article-engaging, concavely arcuate surface presented upstream, toward the concavely arcuate surface of head portion 30a.

Each finger 32 includes: a relatively straight portion 32a in which slot 39 is provided and through which pin 34 extends; and an arcuate portion 32b terminating in an article-engaging abutment surface 32c which in FIGS. 1, 2 and 3 is disposed above the plane of rail bearing surfaces 14a and presented toward head portion 30a of a rocker 30.

Further to the showings of FIGS. 1, 2 and 3, each flanged-end axle 42 is supported for movement on rail bearing surfaces 14a in such position that its flange 42a is disposed laterally of rails 14 and is restrained against axial movement by a guide rail 43 (FIG. 2 only). It will be appreciated that guide rail 43 is disposed to space flange from the rails 14 so that the center of gravity of the axle 42 will be disposed substantially midway between rails 14.

The upper ends of rail surfaces 14a are extended at a lesser angle to the horizontal, as is seen at 114a on rail extensions 114, in provision of an inclined loading chute. A notch 114c is provided to hold an axle 42 until such time it is desired to feed it to the apparatus for downward travel to an unloader 44, by which an axle is fed onto an inclined chute 214a provided with a notch 214b for holding an axle to be removed from the apparatus. Unloader 44 includes a pivot 45 extending between side rail extensions 214 and supporting a rocker 46. One end of rocker 46 includes an abutment 47, and the other end is connected by a pin 48 to a pneumatically actuatable piston rod 49. Construction and arrangement of the unloader is such that movement of rod 49 to the right pivots rocker 46 counter-clockwise from the position shown in FIG. 1, causing abutment 47 to engage and urge an axle 42 from slots 214b. The axle 42 is then further urged onto inclined chute 214a, to roll therealong gravitationally until its rolls into notch 214c and is held therein until its removal.

In operation of the conveyor, and assuming as a starting condition the arrangement of elements shown in FIGS. 1, 2, and 3, drawbars 18 are in their left-hand position. To facilitate understanding of further operation of the apparatus to be described in what follows, and in view of their relative positions, rocker 30 will be referred to as a "head" rocker and rocker 31 referred to as a "tail" rocker. For the left hand position of drawbars 18, each head rocker 30 is in its retracted, right-hand position in which its stop pin 41 has engaged a tail rocker 31 at 31b to urge it to its left-hand, fully extended position, and each arcuate finger 32 is pivoted to its right-hand, fully extended position in which each abutment portion 32c thereof engages an axle 32 on rail bearing surfaces 14a.

As drawbars 18 are moved to the right, and with reference to FIG. 3, each cam 36 engages a corresponding follower 35 to maintain a head rocker 30 in its extended position, which position is maintained by a cam 36 throughout the full right-hand movement of drawbars 18, i.e. through FIGS. 4 to 7. Simultaneously, each cam 38 engages a corresponding follower 37 on a tail rocker 31 where it remains to hold the tail rocker in its fully extended position, until drawbars 18 have moved each cam 38 to the position seen in and to be described in connection with FIG. 6, where a follower 37 begins to roll off its cam 38. Throughout the thus-far described movement of drawbars 18 to the right, each finger 32 has been rotated counterclockwise about its pivot 34, through the interaction of a slot 39 and a pin 40, thereby accommodating gravitational doownward movement of an axle 42 along rail surfaces 14a.

Figure 6:
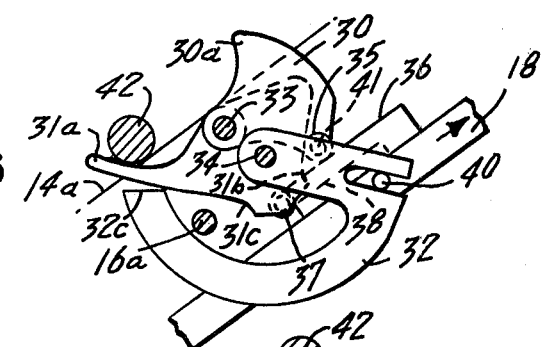
Figure 7:
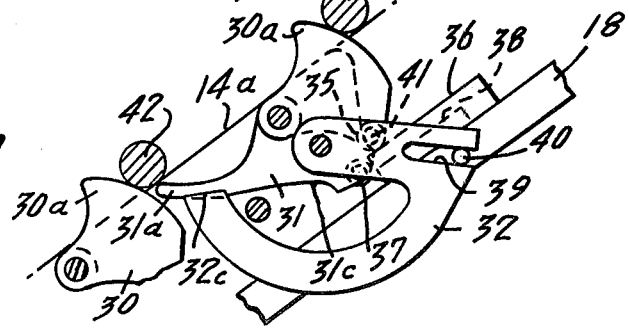

In FIG. 6, retention of an axle 42 has been transferred from the fingers 32 to tail rockers 31. As is seen in FIG. 7, continued movement of the drawbars 18 to their full right-hand position has fully retracted fingers 32, and has removed each cam 38 from its follower 37 to permit counterclockwise pivotation of tail rockers 31 out of engagement with an axle 42, under the urging of the axle. As axle 42 is disengaged from tail rockers 31, it moves gravitationally downwardly and substantially immediately into abutting engagement with the successive head rockers 30.

Drawbars 18 are then again moved to the left, whereby fingers 32 are moved clockwise to a position in which each abutment portion 32c is presented to receive an axle 42 just as head rockers 30 are retracted to release same, and tail rockers 31 are extended thereby reverting all elements to the positions seen and described in connection with FIGS. 1, 2 and 3. While only a single set of the paired elements at one of the article handling stations has been described, it is emphasized that each is identical to the other, and as many stations may be provided as is required to maintain a desired accumulation of articles, i.e. axles 42, in the apparatus.

Operation of the drawbars 18 is cyclic in provision of controlled, substantially steady gravitational flow of axles 42 along the inclined track defined by rails 14.

Alternative to the starting position shown in FIG. 1, the disposition of elements may be as shown in FIG. 7, wherein a first axle 42 is loaded on rails 14 to engage head rocker portions 30a, i.e. with drawbars 18 in full right-hand position.

Further to the disposition of elements shown in FIG. 7, an additionally important aspect of the invention resides in the self-accumulating feature afforded by the apparatus, in the event no axles are being unloaded, either manually at some location along the conveyor or automatically by unloader 44. In FIG. 7, left hand axle 42 engages tail rocker 31 with sufficient force to rotate it counterclockwise about pivot 33, both to move and hold follower 37 out of the influence of its cam 38. Also, by virtue of engagement by portion 31b of tail rocker 31 with pin 41 on head rocker 30 the latter also is pivoted counterclockwise both to move and hold follower 35 out of the influence of its cam 36. So long as no axles 42 are unloaded from the fully loaded conveyor, the continued reciprocating movement of draw bar 18, while effective to move finger 32, is ineffective to operate the head and tail rockers 30, 31 and accommodate movements of the axles along the conveyor. The conveyor under this condition is in an idling accumulating mode. Removal of an axle 42 from any station, including the unloading notch 214c, and under the conditions shown in FIG. 7 will operate to release tail rocker 31 again to couple it and its corresponding head rocker 30 with cams 36, 38 successively to accommodate feeding of axles from upstream station until all stations are again filled with axles. In the event an axle is unloaded for each cycle of the draw bars, feed of the axles will be continuous.

As the axles 42 are moved down the line to notch 214b at the end of the conveyor, unloader rocker 46 is pivoted to urge an axle 42 out of the notch and onto rail surfaces 214a where it rolls into notch 214c for transfer from the conveyor.

Advantageously axles 42 may be unloaded two at a time from the conveyor by removing an axle from each of notches 214b and 214c substantially simultaneously.

It will be appreciated from the foregoing description that the invention affords an improved material handling apparatus facilitating selective accumulation and transfer of elongated, generally cylindrical articles which may be of varied size.

While a preferred embodiment of the invention has been illustrated and described, it will be understood that changes in form and details may be resorted to, and that such changes can be made without departing from the scope of the appended claims.

I claim:

1. In material handling apparatus, conveyor means for moving generally cylindrical articles transversely of their polar axes, comprising: means defining an inclined track for supporting said articles to be moved therealong from a higher to a lower level; a plurality of article-engaging pivotable rocker and finger elements disposed in uniformly spaced relation along said track, said rocker elements being pivotable in a direction to accommodate gravitational movement of an article along said track and present it for engagement with a successive one of said finger elements whereupon said finger element is operable to accommodate gravitational movement of said article along said track and present it for engagement with a successive rocker element, means for driving said rocker and finger elements cyclically in the recited operations thereof to accommodate controlled gravitational movement of an article along said track from said higher to said lower level; and each said rocker element comprises a head rocker presented to the upper end of said track and a tail rocker presented to the lower end of said track, each said head and tail rocker being pivotable about a common pivot point and including an article engaging portion of generally cuspidate configuration movable above and below the plane of said track in the recited accommodation of movement of an article while engaged by said finger element.

2. Apparatus according to claim 1, and characterized by the inclusion of means for driving said rocker elements and said finger elements from a single source, said means for driving comprising cam and cam follower means drivingly coupling said source with said rocker elements, and pin and slot connections drivingly coupling said source with said finger elements.

3. Apparatus according to claim 2, and characterized in that said means for driving comprises drawbar means on which said cam follower means and the pins of the recited pin and slot connections are disposed, said cam follower means and means defining the slots of said connections being disposed on said rocker elements and said finger elements, respectively.

4. Apparatus according to claim 1, 2 or 3, and characterized in that said track comprises a pair of rails of substantially parallel extent and including upwardly presented article-bearing surfaces along which said articles are moved, and pairs of recited rocker and finger elements on mutually opposed regions of said rails, said articles being supported on said rails in such position that their centers of gravity are disposed intermediate said rails.

5. In material handling apparatus of the type including conveyor means for moving generally cylindrical articles transversely of their polar axes from a higher to a lower elevation, improved article transfer means comprising: means defining an inclined track for supporting said articles for controlled gravitational movements therealong; a series of uniformly spaced combinations of rocker and finger elements disposed in the line of extent of said track and operative to accommodate the recited gravitational movements of said articles, each said rocker element comprising head and tail rockers mounted on a common pivot for pivotations in which said head rocker sequentially engages and disengages said article, and each said finger element mounted for pivotation to positions in which it sequentially engages an article disengaged by said head rocker, pivots away from said head rocker to accommodate gravitational movement of said article along said track, followed with release of said article by said finger element and sequential engagement by and disengagement from said tail rocker.

6. Apparatus according to claim 5, and characterized by the inclusion of means for driving said rocker elements and said finger elements comprising drawbar means including cam means drivingly engageable with follower means provided on said rocker elements and pin means drivingly engageable with slot means provided on said finger element.

7. Apparatus according to claim 5 or 6, and further characterized in that said track comprises a pair of substantially parallel rails, and said rocker and spacer elements are mounted on each of said rails, in mutually confronting relationship.

8. Apparatus according to claim 5 or 6 and characterized in that said rocker and finger elements are so constructed and arranged as to be pivotable to positions below and above the plane of said track in provision of the recited disengagement, respectively, of said articles.

9. Apparatus according to claim 5 or 6, and characterized in that said finger element is of generally arcuate configuration and includes an abutment portion at a free end thereof providing the recited engagement of said article, said finger element being pivotally amounted at another portion thereof to move said abutment portion in a generally arcuate path between said head and tail rockers upon the recited disengagement and engagement of said articles thereby.

10. Apparatus according to claims 5 or 6 and characterized by provisions of means affording selective unloading of an article from said conveyor means while fully loaded, said tail rocker while engaged by an article in the absence of unloading of the article being pivotable to a position in which said cam follower means of both said head and tail rockers are moved and held from the influence of said follower means, whereby movements of articles along said conveyor means are halted.

11. Apparatus according to claim 1 or 5 and characterized by provisions of means affording selected unloading of at least one article from said conveyor means, said rocker elements of a fully loaded conveyor being inoperable to accommodate recited movements of said articles along said conveyor means; in the absence of unloading at least one article from said conveyor means.

* * * * *